April 21, 1936. W. WORTHINGTON 2,038,255
APPARATUS FOR AND METHOD OF SHEARING HOLLOW PIECES
Filed March 8, 1933 3 Sheets-Sheet 3
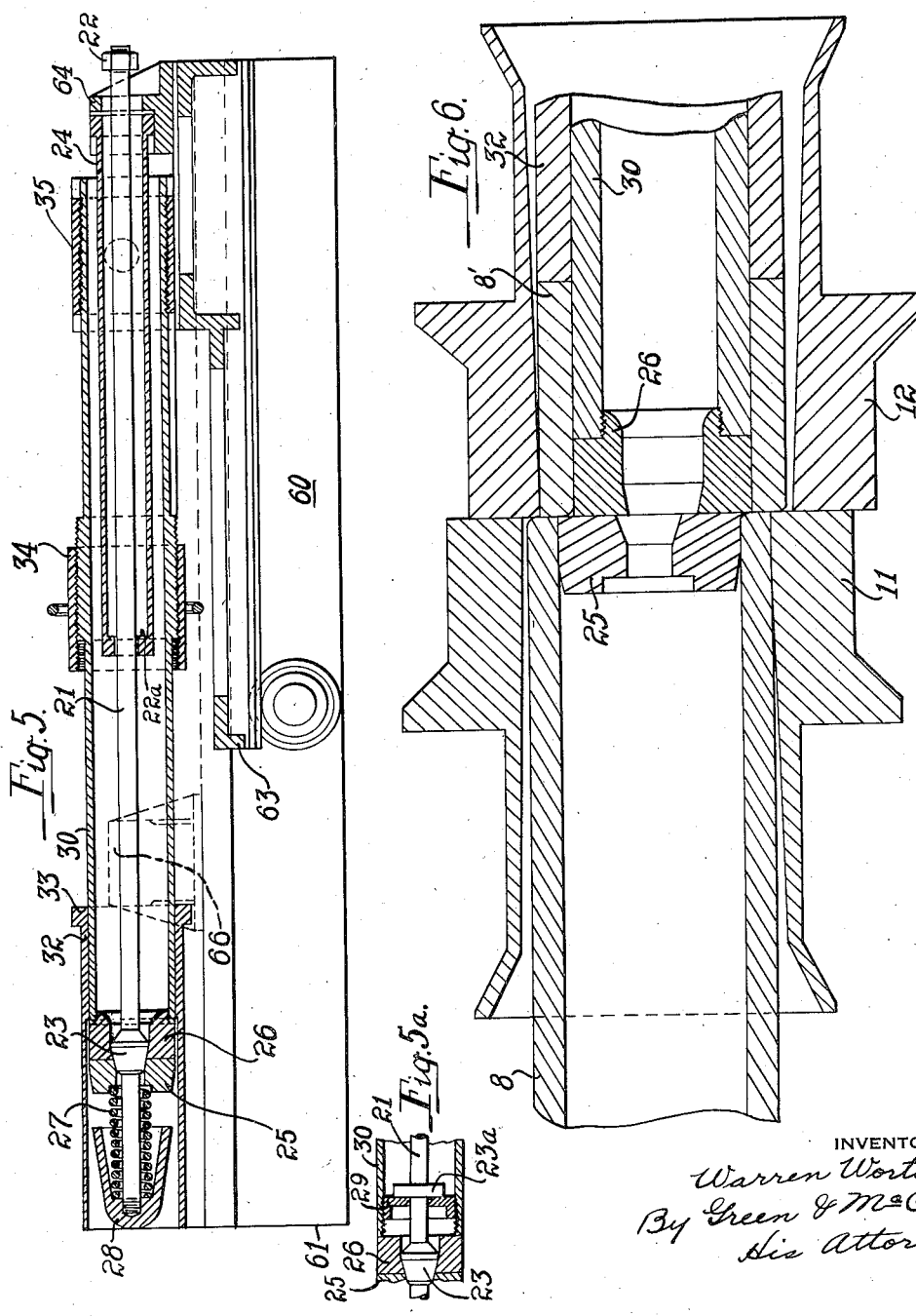

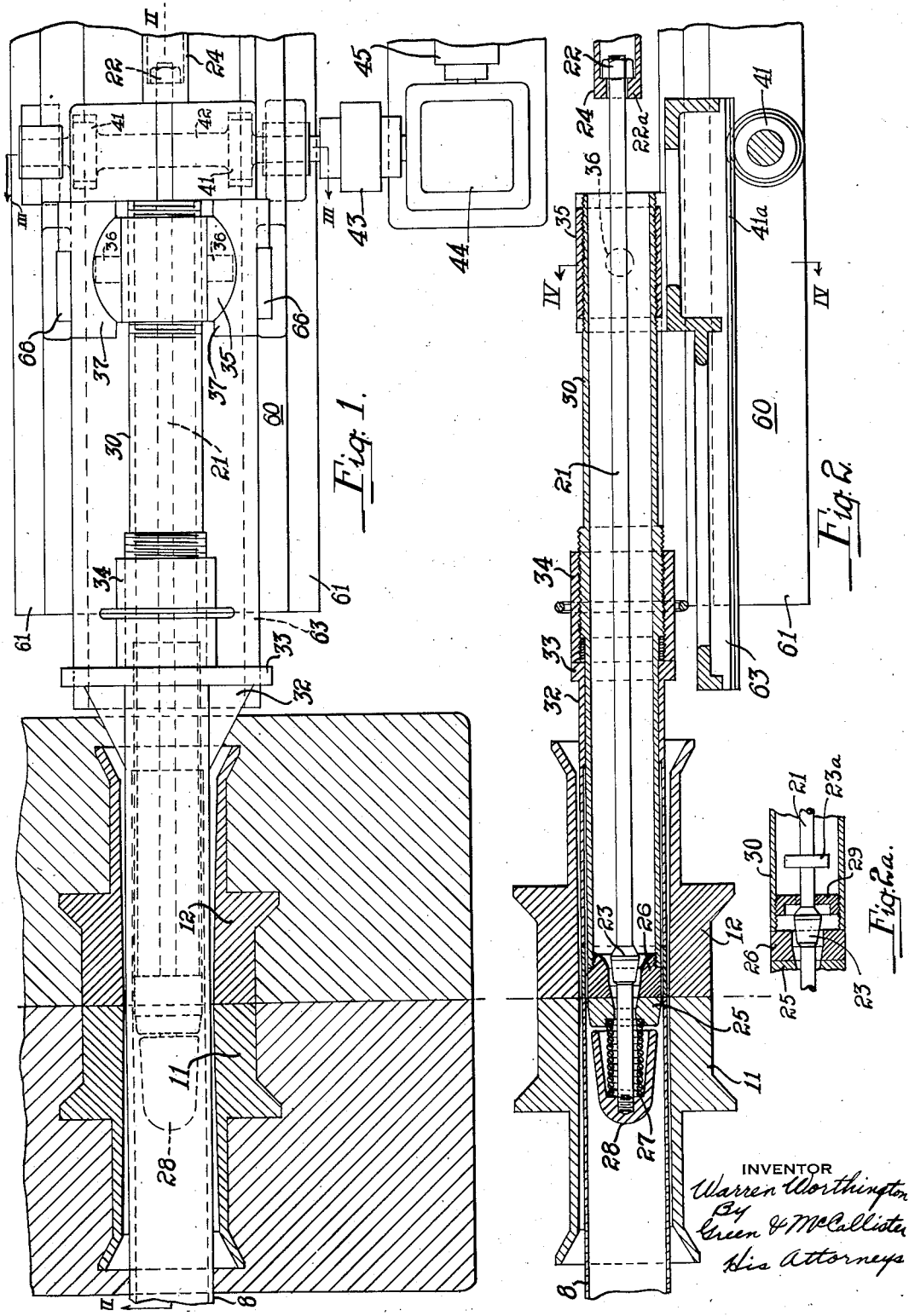

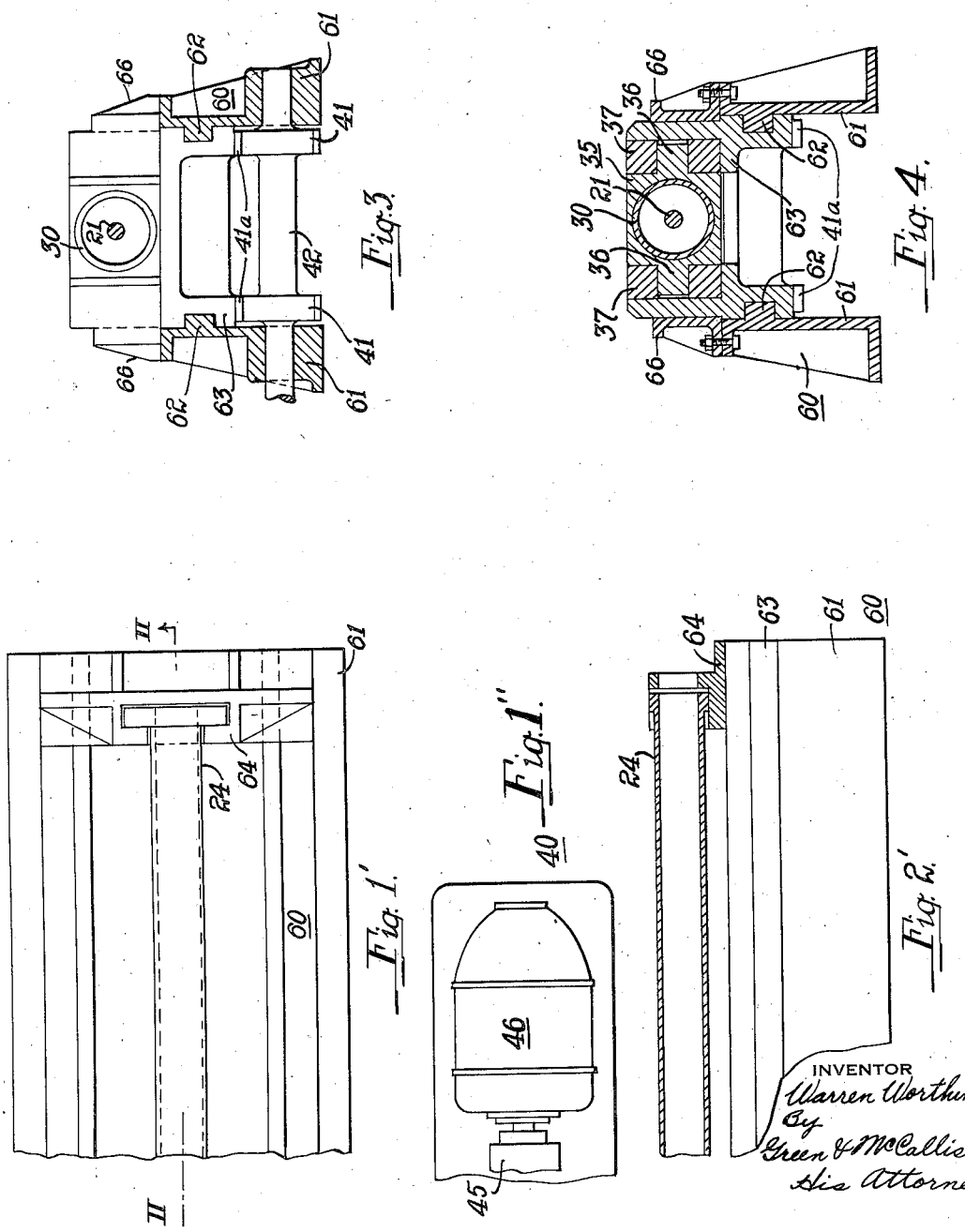

Patented Apr. 21, 1936

2,038,255

UNITED STATES PATENT OFFICE 2,038,255

APPARATUS FOR AND METHOD OF SHEARING HOLLOW PIECES

Warren Worthington, Pittsburgh, Pa.

Application March 8, 1933, Serial No. 660,029

23 Claims. (Cl. 164—40)

This invention relates to apparatus for and method of shearing hollow articles or structures such, for example, as metallic pipe or tubing.

In my copending application Serial No. 642,049, filed November 10, 1932—entitled Shearing method and apparatus—I have pointed out some of the difficulties encountered in connection with the operation of shearing as accomplished by ordinary commercial shears, and particularly where the shearing operation is accomplished by a single stroke, or what may correspond to a single stroke. It will be apparent that the difficulties there outlined will be greatly accentuated where the piece subjected to the shearing operation is hollow or is of such form that the wall or walls thereof are likely to collapse under the shearing strains encountered.

An object of the present invention is to produce a method of shearing hollow pieces or structures which will overcome defects inherent in ordinary searing operations and which will make it possible to replace time consuming and otherwise wasteful cutting operations by a shearing operation, wherein the wall of the hollow piece to be cut is subjected to shearing strains in accomplishing the severance of the piece.

A further object is to produce a method of shearing hollow pieces or structures such that the piece is subjected only to such deformation as is consistent with the forces applied and is not objectionably distorted during the shearing operation.

A still further object is to produce a method of shearing hollow pieces or structures in which the shearing forces are so applied that such deformation as is encountered is controlled and the stresses set up in the piece subjected to such forces so cooperate as to accomplish the shearing with minimum distortion of the piece.

A still further object is to produce a method of shearing hollow pieces such as metal pipe, conduits and the like, wherein the distortion of the piece under shearing strain contributes to the effectiveness of the shearing operation and to a large extent localizes the shearing strains, set up in the piece, to the contemplated shearing plane.

A still further object is to produce a simple and effective apparatus which may be employed in carrying out the specific embodiment of the method of procedure herein specifically set forth.

The procedure here set forth as an embodiment of my invention broadly involves subjecting the hollow piece to be sheared to internal, as well as external shearing forces so applied that opposed portions of the wall of the piece or opposed walls of the piece are simultaneously subjected to shearing strains. In a more limited aspect the invention may be defined as action and reaction forces so applied to the piece to be sheared that opposed portions of the wall or opposed walls of the piece are first simultaneously subjected to shearing strains, and then other opposed portions of the wall or other opposed walls of the piece are simultaneously subjected to such shearing strains, so that the complete procedure of shearing the piece consist in successively subjecting circumferentially spaced portions of the wall of the piece to internally and externally applied shearing strains, thus swedging the wall of the piece adjacent the line of shear prior to and while completing the severance or shearing of the piece.

In carrying out the method of shearing here contemplated, the hollow piece to be sheared is internally reinforced at or immediately adjacent the plane of application of the shearing force or forces, so as to resist the tendency of the wall or walls of the piece to collapse under the shearing strains. The internal reinforcing is so accomplished as to create, during the application of the external shearing force or forces, reactive stress which subjects the internal surface, or rather portions of the internal surfaces, of the piece to shearing strains acting in a plane substantially coincident with the plane of application of the externally applied force or forces. The external shearing force is then applied to the piece so reinforced, in such a way that it acts in the predetermined plane and the application of this force is such that the strains set up in the piece to be sheared render the reinforcing instrumentalities effective as shearing elements acting within the piece and acting simultaneously with the externally applied shearing forces or stresses.

It will, of course, be apparent to those skilled in the art that it is impossible to so apply a shearing force to any piece or structure that it acts in a single plane. That is to say, even with the most modern mechanisms it is impossible to so apply a shearing force to material such as metal, that the effect of the force on the metal is limited to a geometric line or a geometric plane, consequently, in describing my invention, it will be understood that I do not limit myself to the application of shearing forces in a single geometric plane, but my intent is to so localize the strains in the piece being sheared and occasioned by the application of the shearing forces, as to render them effective in an approximation of a geometric plane and I so apply the shearing forces that the distorting strains necessarily set up in the piece acted upon, will not result in objectionable distortion of the piece.

In my application above referred to, I have set forth a shearing procedure in which the shearing force is externally applied to the piece to be sheared and the point of its application to the piece is varied while varying the intensity of the force or forces so applied. While the invention here set forth is, in its more specific aspect, a carrying forward of the invention set forth and described in my said application by combining therewith the utilization of internally applied forces, it also has the broader aspect of the simultaneous application of internal and external shearing forces as above defined.

In the drawings forming a part of this application, Figure 1, when taken in connection with Fig. 1' and Fig. 1'' (Sheet 2), illustrates in plan view a mechanism which may be employed in carrying out my improved method when utilized in connection with a shearing mechanism such as diagrammatically illustrated in section in Fig. 1;

Fig. 2, taken in connection with Fig. 2' (Sheet 2), is a vertical sectional elevation of the apparatus shown in Fig. 1—Fig. 1', and the parts thereof are shown in the same relative positions;

Fig. 3 is a transverse sectional view taken along the line III—III of Fig. 1;

Fig. 4 is a transverse sectional view taken along the line IV—IV of Fig. 2;

Fig. 5 is a longitudinal sectional view of the apparatus shown in Figs. 1 and 2, but with the mandrel mechanism located in a withdrawn position;

Fig. 2a is a fragmental sectional view of apparatus corresponding to the apparatus illustrated in Fig. 2, but illustrating a modification of a structural detail of the apparatus shown in Fig. 2;

Fig. 5a is a fragmental view corresponding to Fig. 2a but illustrating the parts of the apparatus there disclosed in the relative positions assumed when the reinforcing mandrel is withdrawn from the operative position, as shown in Fig. 5; and Fig. 6 is an enlarged sectional view of a portion of the apparatus shown in Figs. 1 and 2 and illustrates a step in the method of procedure forming a part of the present invention.

The apparatus illustrated as an embodiment of my invention includes shear mechanisms for applying shearing force to the external surface or surfaces of the piece to be cut, and a two-part mandrel which is adapted to fit the internal bore or the internal cavity of the hollow piece to be cut and is also adapted to be moved to a position within the hollow piece such that the plane of cleavage between the two parts thereof is substantially coincident with the plane of cleavage of the elements constituting the external shear mechanism. Each part of the mandrel is movable transversely with relation to the other part so that it is capable of moving with one of the external shear elements, during the shearing operation. With this arrangement, each part of the mandrel in effect forms an internal shear blade which accomplishes a shearing operation by reason of its cooperation with an opposed external shear element, and under such conditions that opposed walls or opposed portions of the wall of the piece acted on, are simultaneously subjected to shearing strains.

In Figures 1, 2, 5 and 6, I have shown a two-part mandrel 25—26 associated with means for moving the mandrel to position in a hollow structure such as a metal pipe or conduit 8. In order to move the mandrel into the pipe so that it reinforces the wall thereof on either side of the shearing plane and so that the line of cleavage between the two parts of the mandrel substantially coincides with the line of cleavage between the external shear elements 11 and 12, shown in Figures 1, 2 and 6, it is necessary to provide means for holding the two parts of the mandrel in such a position with relation to each other that they in effect constitute a single piece. This is accomplished in the apparatus illustrated in Figures 1 and 2 by mounting one part 25 of the mandrel on the end of a positioning sleeve 30 and by providing means for yieldingly holding the other part 26 of the mandrel against a lateral face of the part 25 and means, engaging both parts, for centering the part 26 with relation to the part 25 so that the peripheral surfaces of the two parts form, in effect, one unbroken peripheral surface.

As shown, each part of the mandrel is provided with a central aperture through which a positioning rod 21 projects. An annular centering lug or shoulder 23 is formed on the rod adjacent the forward end thereof and, in cooperation with said central apertures, acts to center the part 26 with relation to the part 25. In order to accomplish this centering and also to hold the part 26 against the lateral face of the part 25, I provide a coiled spring 27, which surrounds the projecting end of the rod 21 and acts between a spring seat, formed in one face of the part 25, and a spring seat formed on a bell shaped nose 28 secured to the end of the rod 21. The bell flange of this nose overhangs a portion of the rod and a portion of the spring 27 and the nose functions to guide the rod and the mandrel into the pipe to be cut.

The aperture formed in the part 25 is, on the entering side, of sufficient diameter to receive and pass the lug 23. This aperture is, however, tapered at a point midway between its ends and the forward portion of the lug 23 is correspondingly tapered and is of sufficient diameter that the tapered portion of the aperture forms a shoulder or stop for the lug. The adjacent portion of the aperture in the mandrel part 26 is correspondingly tapered and consequently the spring 27 acts to hold the lug 23 within the combined aperture and against the tapered shoulder thereof and to force the part 26 against the part 25, thus centering the two parts of the mandrel with relation to each other and centering the part 26 with relation to the sleeve 30. With this arrangement the operation of moving the two-part mandrel to position within a pipe 8 to be cut, simply consists of introducing the nose 28 into the pipe and then moving the mandrel and the nose along the pipe to the desired position through the agency of the sleeve 30.

During the shearing operation it is necessary to release the part 25 of the mandrel so that while it is held against the part 26 it is capable of moving transversely with relation to that part. It is apparent that in a pipe shearing operation, a limited amount of such transverse movement will suffice, since the metal to be sheared is relatively thin, and in the apparatus illustrated, the part 25 is given the necessary freedom of transverse movement, with relation to the part 26, by withdrawing the tapered portion of the lug 23 from the tapered portion of the combined aperture formed in the parts 25 and 26. It will be noted that the diameter of the forward portion of the rod 21 is somewhat less than the least internal diameter of the aperture through the part 25, and is considerably less than the least diameter of the aperture through the part 26. It is therefore apparent that such relative transverse movement of the parts 25 and 26 as is necessary to accomplish a shearing of the wall of the pipe 8, will not be interfered with even though the rod 21 projects through the combined apertures of the two-part mandrel. That is to say, with the arrangement of apparatus described, the throw of the element 25 with relation to the element 26 is sufficient to accomplish the work in hand, because of the clearance between the rod 21 and the aperture in the part 25 and also because of the clearance between the lug 23 and the aperture in the part 26, and the fact that the end of the rod is capable of some motion, all as shown in Fig. 2.

In carrying out my method of shearing, the annular shear elements 11 and 12 are first moved to a position of coincidence, as shown in Figures 1 and 2 and the pipe 8 is then moved to position in these elements, as shown in Figure 2. The sleeve 30 is then moved from a position shown in Figure 5 to the position shown in Figure 2, during which motion the nose 28 and the two-part mandrel are moved into the pipe 8 to be cut, and to such a position that the plane of cleavage between the two parts of the mandrel substantially coincides with the contemplated plane of shear or the plane of cleavage of the external blades 11 and 12. Immediately before this position is reached the forward movement of the rod 21 is stopped, thereby compressing the spring 27 and withdrawing the tapered portion of the lug 23 out of the tapered portion of the combined aperture of the two-part mandrel and to a position, with relation to the mandrel, such as shown in Figure 2. It will be apparent that this relative movement between the rod 21 and sleeve 30 can be accomplished after the two-part mandrel is in the shearing position, but I prefer to stop the forward movement of the rod, and thus release the locking engagement between the two parts of the mandrel, as the mandrel is moving to the shearing position.

With the parts as shown in Figure 2, the spring 27 is compressed and firmly holds the lateral face of the mandrel 25 against the lateral face of the mandrel 26, and both these faces, in effect, lie within the shearing plane or the plane of cleavage between the external shear elements 11 and 12. The shear elements 11 and 12 are then moved to divergent positions as described in my copending application, and it will be apparent that such a movement causes each part of the two-part mandrel 25—26 to function as a shear blade. That is to say, assuming that the external shear element 11 illustrated in Figure 6 is moving upwardly with relation to the element 12, this upward motion is resisted by the wall of the pipe 8 which is reinforced by the part 25 of the mandrel and consequently any yield of the pipe wall, under the shearing strain occasioned by the movement of the part 11, will occasion transverse movement of the mandrel part 25 with relation to the mandrel part 26, but in any event, the mandrel part 25 cooperates with the shear element 12 in subjecting the upper portion of the wall of the pipe 8 to shearing strains and the mandrel part 26 cooperates with the external shear element 11 in subjecting the lower portion of the wall of the pipe to shearing strains and it is therefore apparent that the shearing of the wall of the pipe is ultimately accomplished while the walls thereof are reinforced by the mandrel parts, at or immediately adjacent to the plane of shear.

As previously stated, I contemplate so moving the external shear elements 11 and 12 that these elements successively move from positions of coincidence to positions of divergence, and this motion is so controlled that different portions of the piece to be sheared are successively subjected to shearing strains, all as is specifically set forth in my said copending application. That is, in accomplishing the shearing of the pipe, the parts 11 and 12 will move from a position of coincidence to a position of divergence, and then back to a position of coincidence, and the next movement to a position of divergence will be along a different path and will subject a different portion of the pipe wall to shearing strains. It will be apparent that such a procedure will render different portions of the cutting edges of the two parts of the mandrel effective in imparting shearing strains to the pipe being cut, but I do not wish to limit the present invention to such a movement of the external shear elements or to any particular movement of those elements, since it will be apparent that the two-part mandrel will cooperate with the external shear elements in imparting shearing strains to opposed portions of the wall of the pipe being cut, because each part of the mandrel is free to move transversely in any direction with relation to the other part and the shearing edge of each part of the mandrel is throughout its entire extent in reinforcing contact with the internal surface of the pipe wall.

While various forms of apparatus may be employed for carrying forward the contemplated procedure and for introducing the two-part mandrel into the pipe to be cut, the apparatus illustrated is admirably adapted for carrying out the procedure here described and particularly where that procedure contemplates moving one or both of the external shear elements along a cycloidal path during the shearing operation, as defined by my copending application.

As shown in the drawings, the sleeve 30 is movably mounted on a carriage 63 which in turn is slidably mounted on a frame 60 and is supported by guides 62 secured to or forming a part of that frame. The carriage is actuated by pinions 41, which engage rack teeth 41a, on the underside of the carriage 63. Two such pinions are shown and they are mounted on a shaft 42, which is journaled in suitable bearings, shown formed as an integral part of the frame 60. The shaft 42 projects beyond one of its bearings and is driven by any suitable means capable of reversing its rotation. In the drawings, the shaft 42 is driven by a reversing motor 46, through the agency of a gear reduction unit 44 and couplings 43 and 45.

In order that the sleeve 30 may have some degree of angular movement, it is secured to the carriage by a universal connection, as shown in Figures 1 and 4. As there shown, the sleeve is threaded into a member 35, which is provided with lateral projecting trunnions 36, journaled in ball members 37. The members 37 are suitably journaled on the frame portion of the carriage. With this arrangement, the ball members accommodate a horizontal, and the trunnions 36 accommodate a vertical swing of the sleeve 30, with the result that the sleeve can move or can be moved to any angular position, within limits, with relation to the carriage 63.

It will be apparent that the movement of the carriage 63 must be sufficient to move the mandrel from the shearing position, as shown in Figure 2, to a position, such as shown in Figure 5, in which the nose 28 is free of the external shear mechanisms 11—12. As a matter of fact, the sleeve must be moved to such a position with relation to the external shear mechanisms that the severed end 8' of the pipe may be stripped therefrom. It is, however, apparent that the forward position of the sleeve is of utmost importance, since in that position the line of cleavage between the two parts of the mandrel must substantially coincide with the line of cleavage between the two parts of the external shear mechanism. I therefore provide for adjusting the position of the sleeve 30 with relation to the carriage 63, and this is accomplished by providing the screw connection between the sleeve and the part 35.

In order to guide the positioning rod 21 during its movement with the sleeve 30, I provide a centering sleeve 24, which surrounds the rod and is secured at one end to a fixed portion of the frame. As shown in Figures 1', 1'' and 5, the sleeve is secured to the portion 64 of the frame by means of a key connection and projects forwardly so that its forward end may extend into the sleeve 30 as that sleeve is moved to the rearward position by the carriage 63. The rod 21 extends through the sleeve 24 and its rear end is provided with an adjustable stop, in the form of a bolt 22 screwed on to the rear end of the rod, which engages a shoulder 22a formed at the forward end of the sleeve 24. As the rod moves forwardly with the sleeve 30, it slides through the sleeve 24 until its stop 22 is engaged by the shoulder 22a. This stops further movement of the rod and, where the sleeve 30 continues its forward movement, the rod 21 then acts to compress the spring 27 and, as previously described, to withdraw the centering lug 23 out of engagement with the two parts of the mandrel. The forward position of the carriage 63 and consequently of the sleeve 30, is controlled by a stop 66 fixedly mounted on the frame 60. Thus it is apparent that with the apparatus illustrated, the two-part mandrel is inserted into a pipe 8 to be cut, by the cooperative action of the rod 21, the spring 27, the sleeve 30 and the carriage 63. The final position of the mandrel within the pipe 8 or with relation to the external shear mechanism, is determined by the carriage stop 66 and the adjustable connection between the sleeve 30 and the part 35.

For the purpose of stripping severed portions of pipe from the mandrel and the sleeve 30, I provide a stripper sleeve 32 which surrounds and is carried by the sleeve 30. As shown, this sleeve 32 projects forwardly and one of its positions, with relation to the sleeve 30, is determined by an adjustable collar 34 screwed onto a screw threaded shoulder of the sleeve 30. This collar engages a flange 33 formed on the rear end of the sleeve 32 and therefore forms a positioning member for that sleeve. As the sleeve 30 is advanced from the position shown in Figure 5 to the position shown in Figure 2, the sleeve 32 may move forwardly with it until such time as its forward end engages the end of the pipe to be cut. When this happens the sleeve 32 will be held against movement until it is engaged by the adjustable stop 34, at which time it will then be carried forward with the sleeve 30 and, by moving the pipe 8 to be cut, will properly position the pipe with relation to the plane of shear, or with relation to the shearing mechanisms. As the sleeve 30 is withdrawn from the position shown in Figure 2 to the position shown in Figure 5, the sleeve 32 moves with it until its flange 33 is engaged by the stop 66, at which time the sleeve 32 will, in effect, move forwardly with relation to the sleeve 30 and strip the severed end of the pipe from the two-part mandrel. It will also be apparent that as the sleeve 30 moves rearwardly, the stop 22 will tend to move away from the shoulder 22a and therefore the rod 21 will first diminish the pressure on the spring 27 on the part 25 and will then move, in response to the action of the spring so that the centering lug 23 again enters the tapered portion of the combined aperture in the two-part mandrel. This will again center the part 25 of the mandrel with relation to the part 26 and the rod 21 and the parts carried by it will all move with the sleeve 30.

In Figures 2a and 5a, I have shown a modified arrangement for mounting the two-part mandrel in position with relation to the sleeve 30. There, the part 26 of the mandrel is free to move transversely of the sleeve 30 and the centering lug 23 on the rod 21 operates to center both parts 25 and 26 with relation to the sleeve. As there shown, the rod 21 projects through an adjustable stop 29 screwed into the forward end of the sleeve. With this arrangement, the throw of the rod 21, with relation to the sleeve 30, may be controlled by the stop 29, and a collar 23a formed on the rod 21. It will be understood that in other respects the relationship between the two-part mandrel and the sleeve 30 are as illustrated in Figures 2 and 5, and that an adjustable stop, such as 22 and its cooperating shoulder 22a is essential.

In carrying forward my improved method of shearing with the apparatus illustrated, the two-part mandrel is first mounted on the forward end of the sleeve 30, and is held in place thereon by the combined action of the centering mechanism (including the lug 23) and the spring 27. The mandrel, preceded by the nose 28, is then inserted into the end of a pipe 8 to be sheared, by the forward movement of the carriage 63, it being understood that the pipe 8 is first located in the shearing aperture of the external shear mechanisms 11 and 12. As the forward motion of the carriage 63 and the sleeve 30 proceed, the stop 22 engages the shoulder 22a, thus stopping the movement of the rod 21 and withdrawing the centering lug 23 out of engagement with the two parts of the mandrel and compressing the spring 27 so that the two parts of the mandrel are held firmly together. The further forward movement of the sleeve 30 so positions the mandrel that the plane common to its two parts substantially coincides with the plane defined by the contacting faces of the two external shear members 11 and 12. The shear members are then actuated, as before described, and preferably so that they in cooperation with the two-part mandrel, will first partially shear opposed portions of the wall and will then partially shear other opposed portions, so that finally by a progressive action the wall will be sheared throughout its entire circumferential extent. For example, the second shearing operation may be at right angles to the direction of the first, and the third shearing operation may act along the path of the first movement of the shears, but preferably in an opposite direction. The divergence of the members 11 and 12 may be progressively increased during these successive shearing operations so that the wall of the pipe is finally severed, and with little or no appreciable distortion of the pipe or without objectionable deformation of the pipe wall.

The carriage 63 is then moved in the reverse direction to withdraw the mandrel from the external shear mechanisms 11—12, and this movement strips the severed end 8' of the pipe from the sleeve 30 by the action of the stripper sleeve 32 and again centers the mandrel parts by the operation of the centering lug 23.

It will be understood that the mandrel will be fitted to the internal shape of the piece to be cut and is preferably of such size and form that it forms a close fit with the internal surface of the piece, the intent being to prevent any appreciable collapsing distortion of the wall or walls of the piece under the shearing stresses encountered during the shearing operation. In this connection it may be stated that an important feature of my invention is the reinforcing of the wall against collapse distortion and on both sides of the shearing plane. There are many advantages gained by my invention, but it is important to note that a hollow structure may be sheared without undue distortion and that such distortion as necessarily results from the application of shearing strains is not only not objectionable, but is beneficial, since by employing a mandrel of proper diameter, the shearing operation insures the desired internal diameter of the sheared end of the pipe. It will be apparent that the portions of the pipe reinforced by the two-part mandrel are, in effect, subjected to a swedging operation during the act of shearing, and under such conditions that the pipe wall is not only prevented from collapsing, but is trued up to the desired diameter. A reference to Figure 6 will also disclose that there is some rounding of the severed end of each sheared section of the pipe, which is advantageous in case these ends are to be either internally or externally threaded. It is thus apparent that the swedging operation, above referred to, is of importance, and that by selecting a mandrel of proper size and form, the end of the sheared section can be to some extent shaped or trued up during the shearing operation.

While I have employed the term "shearing force" or "shearing stress" throughout this application, it is apparent that the procedure here set forth has a broader application than the shearing of hollow structures, since it may be employed in connection with any cutting operation or even where the forces applied to the piece acted upon are merely distorting forces. It will also be apparent that I have employed the term "hollow structure" in a broad sense to designate structures where the wall or walls thereof enclose or partially enclose an internal recess or cavity, and that the wall in question need not form a closed geometric figure, and need not be regular in outline.

While I have described the preferred embodiment of the method of procedure here outlined, and one form of apparatus for carrying out that procedure, it will be apparent that various changes and omissions may be made in the separate steps of the procedure here defined, and that additions or omissions may be made therein without departing from the spirit and scope of the invention as defined by the appended claims, and also that the apparatus herein disclosed may be modified and changed without departing from the spirit and scope of the claims hereof defining such apparatus.

What I claim is:

1. A step in the method of shearing hollow structures, which consists in successively subjecting different portions of the wall of such a structure to shearing stresses and in reversing the strain couples set up in each portion of the piece upon a reapplication of shearing stresses thereto.

2. A shear mechanism for hollow structures comprising opposed shear blades adapted to engage the exterior of such a structure, a two-part mandrel adapted to be located within such structure with the plane of contact of the parts thereof substantially coinciding with the plane of shear, and means for moving such opposed shear blades relatively to each other.

3. A shear mechanism for hollow structures comprising opposed shear blades having cutting edges in the form of a closed geometric figure, a two-part mandrel, means for centering the two parts of said mandrel with relation to each other, means for moving the mandrel parts into a structure to be cut, means for yieldingly holding the two parts of the mandrel in engagement, and means for actuating at least one of said blades.

4. In combination with a shear mechanism, a two-part mandrel, mandrel supporting means, and disengageable means for positioning at least one part of said mandrel with relation to said supporting means.

5. In combination with a two-part mandrel, mandrel supporting means, means for positioning one part of said mandrel with relation to said supporting means, means for yieldingly holding said mandrel parts in contact with each other and means for disengaging said positioning means so that one mandrel part is free to slide on the other.

6. In combination with a shear mechanism for hollow structures, a two-part mandrel, means for holding the parts of said mandrel in engagement with each other, disengageable means for interlocking the parts of said mandrel, means for moving the mandrel into the cavity of a structure to be sheared and means for disengaging said disengageable means.

7. In combination with a two-part mandrel, mandrel support means, disengageable means for engaging both parts of said mandrel and centering them with relation to each other, and means for moving said disengageable means out of engagement with at least one of said mandrel parts.

8. In combination with a two-part mandrel, mandrel support means, and means for securing one part of said mandrel to said means, including a centering device, and a spring for actuating said device and holding the two parts of said mandrel in engagement with each other.

9. A method of shearing a hollow structure which consists in successively applying shearing strain to spaced points around the wall of such structure by applying internal and external forces to such wall at such spaced points.

10. A method of shearing a hollow structure which consists in successively applying shearing strain to spaced points around the wall of such structure by applying internal and external forces to such wall at such spaced points, and in varying the degree of such forces as the shearing operation proceeds.

11. A method of deforming a hollow structure which consists in successively applying deforming strains to the structure at spaced points around the structure by applying internal and external forces to the structure and by varying the points of application of such forces to the structure.

12. A method of deforming a hollow structure which consists in successively applying deforming strains to the structure at various points around it, by applying internal and external forces to the structure and by varying the points of application of such forces while varying the direction of their application.

13. A method of shearing a hollow structure which consists in successively subjecting spaced portions around the wall of such structure to shearing strain by successively applying simultaneously acting internal and external forces to such wall at such spaced portions, in reversing the direction of application of such forces with relation to such wall at different points around it and in varying the degree of such forces as the shearing operation proceeds.

14. A shear mechanism for hollow structures comprising opposed shear blades adapted to surround and engage the exterior of such a structure, a two-part mandrel adapted to be located within such structure, mandrel support means therefor, disengageable means carried by said support for centering one part of said mandrel with relation to the other, and means for moving said disengagable means out of engagement with at least one of said parts.

15. A shear mechanism for hollow structures comprising opposed shear blades adapted to surround and engage the exterior of such a structure, a two-part mandrel adapted to be located within such structure, mandrel support means therefor, disengagable means carried by said support for centering one part of said mandrel with relation to the other, means for moving said disengagable means out of engagement with at least one of said parts, and means for yieldingly holding the parts of said mandrel in engagement with each other.

16. A shear mechanism for hollow structures comprising opposed shear blades adapted to surround and engage the exterior of such a structure, a two-part mandrel adapted to be located in such structure with the plane of contact of the parts thereof substantially coincident with the plane of shear, means for positioning said mandrel within such structure and yieldable means for holding the two parts of said mandrel in engagement with the other during the shearing operation.

17. A shear mechanism for a hollow structure comprising opposed shear blades adapted to surround and engage the exterior of such a structure, a two-part mandrel, means for positioning such mandrel within such structure with the plane of contact of the parts thereof substantially coincident with the plane of shear, and means for yieldingly holding the parts of said mandrel in contact with each other during the shearing operation.

18. In combination with a shear mechanism for a hollow structure, opposed shear blades adapted to engage the exterior surface of such a structure, a two-part mandrel, a mandrel support for moving said mandrel into a hollow structure with the plane of contact of the parts thereof substantially coincident with the plane of shear, and means for effectively disengaging one part of said mandrel from said support while yieldingly holding it in contact with the other mandrel part during the shearing operation.

19. In combination with a shear mechanism for a hollow structure, opposed shear blades adapted to engage the exterior surface of such a structure, a two-part mandrel, a mandrel support for positioning said mandrel in a hollow structure with the plane of contact of the parts thereof substantially coincident with the plane of shear, and disengageable means for centering at least one part of said mandrel with relation to said holding means and for effectively disengaging at least one such part therefrom while yieldingly holding the parts of the mandrel in contact one with the other.

20. In combination with a shear mechanism for a hollow structure, a mandrel adapted to be located within such a structure, a mandrel support for positioning said mandrel in said structure and a stripper for limiting the movement of such support with such structure and for stripping the sheared structure from said mandrel, and means for moving said support relative to said stripper.

21. In combination with a shear mechanism for a hollow structure, a mandrel, a mandrel support for positioning said mandrel in a hollow structure to be sheared, movable means for actuating said support, and a universal joint between said means and said support.

22. A method of shearing a tubular structure, which consists in internally reinforcing the wall of such structure on both sides of the contemplated shearing plane, applying shearing force to diametrically opposed portions of the wall of such structure to swedge the same and then completing the shearing operation by successively subjecting circumferentially spaced portions of such wall to swedging and shearing strains until severance of the structure is accomplished.

23. Steps in the method of shearing hollow structures which includes, applying a shearing strain to a portion of the wall of such a structure while simultaneously swedging portions of such wall adjacent the line of shear, applying a shearing strain to an opposite portion of the wall of such structure while simultaneously swedging opposite portions of the wall adjacent the line of shear.

WARREN WORTHINGTON.